(12) United States Patent
Kreidler et al.

(10) Patent No.: US 10,930,899 B2
(45) Date of Patent: Feb. 23, 2021

(54) ELECTROCHEMICAL CELL AND APPARATUS CONTAINING THE CELL

(71) Applicant: VARTA Microbattery GmbH, Ellwangen Jagst (DE)

(72) Inventors: Bernd Kreidler, Ellwangen (DE); Goran Kilibarda, Schwäbisch Gmünd (DE); Rainer Hald, Ellwangen (DE); Winfried Gaugler, Ellwangen (DE); Claus-Christian Fischer, Ellwangen (DE); Jürgen Ernsperger, Neuler (DE); Rolf Brenner, Ellwangen (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 107 days.

(21) Appl. No.: 16/320,644

(22) PCT Filed: Jul. 18, 2017

(86) PCT No.: PCT/EP2017/068089
§ 371 (c)(1),
(2) Date: Jan. 25, 2019

(87) PCT Pub. No.: WO2018/019653
PCT Pub. Date: Feb. 1, 2018

(65) Prior Publication Data
US 2019/0165335 A1 May 30, 2019

(30) Foreign Application Priority Data
Jul. 26, 2016 (EP) .................................... 16181240

(51) Int. Cl.
*H01M 2/02* (2006.01)
*H01M 10/04* (2006.01)

(52) U.S. Cl.
CPC ........... *H01M 2/0222* (2013.01); *H01M 2/02* (2013.01); *H01M 10/0427* (2013.01); *H01M 10/0431* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 3,490,949 A | 1/1970 | Deschamps | |
| 5,501,916 A * | 3/1996 | Teramoto | H01M 10/617 429/94 |
| 2007/0247786 A1 | 10/2007 | Aamodt et al. | |
| 2008/0102360 A1 | 5/2008 | Stimits et al. | |
| 2012/0015224 A1 | 1/2012 | Pytlik et al. | |
| 2017/0187008 A1 | 6/2017 | Gaugler | |
| 2018/0069261 A1 * | 3/2018 | Brenner | H01M 2/022 |

FOREIGN PATENT DOCUMENTS

| | | |
|---|---|---|
| JP | 2007-234453 | 9/2007 |
| WO | 2010/089152 | 8/2010 |
| WO | 2010/146154 | 12/2010 |

* cited by examiner

Primary Examiner — Wojciech Haske
(74) Attorney, Agent, or Firm — DLA Piper LLP (US)

(57) ABSTRACT

An electrochemical cell includes an annular electrode composite body; and an annular liquid-tight housing formed as a hollow cylinder and including an annular interior space, wherein the housing is arranged around a central aperture or recess, the housing has a height of 5 mm to 40 mm and an external diameter of 6 mm to 20 mm, and the annular electrode composite body is arranged in the annular interior space.

7 Claims, 5 Drawing Sheets

ELECTROCHEMICAL CELL AND APPARATUS CONTAINING THE CELL

TECHNICAL FIELD

This disclosure relates to an electrochemical cell and to an apparatus comprising such a cell.

BACKGROUND

Particularly well-known examples of electrochemical cells are button and round cells. Button cells normally have a cylindrical housing, the height of which is equal to its diameter or smaller than the latter. In round cells, the housing is likewise formed cylindrically, but its height exceeds its diameter.

Respectively very different electrochemical systems can be contained in the housings. Very widespread are cells based on zinc/air, zinc/$MnO_2$ and nickel/zinc. In addition, secondary (rechargeable) systems are very widespread. Examples of these are nickel/metal hydride cells, nickel/cadmium cells and lithium ion cells.

The cylindrical housing of round and button cells generally consists classically of two solid, mostly metallic housing parts, between which an electrically insulating seal is arranged. One of the housing parts is in electrical contact with the positive electrode and is accordingly positively polarized. The other is in electrical contact with the negative electrode and is accordingly negatively polarized. The seal is intended to prevent electrical contact between the oppositely polarized housing parts. Furthermore, it is intended to counteract any escape and also penetration of liquid or moisture out of or into the housing.

Lithium-ion cells can achieve very high energy densities. Cells based on lithium ions may contain a composite body in the form of a cell stack that consists of a plurality of individual cells. Normally, however, the cells contain a wound composite body that is generally an individual cell in wound form. Button cells having wound composite bodies are described, for example, in WO 2010/146154 A2 and WO 2010/089152 A1.

Wound composite bodies are normally made by spiral winding of strip-like electrodes and at least one strip-like separator. As a rule, they have the sequence positive electrode/separator/negative electrode. Frequently, such wound composite bodies are produced as what are known as bi-cells having the possible sequences negative electrode/separator/positive electrode/separator/negative electrode or positive electrode/separator/negative electrode/separator/positive electrode. The electrodes usually each comprise a metallic current collector and electrochemically active components and electrochemically inactive components.

All materials that can absorb lithium ions and discharge them again are suitable for electrochemically active components (often also designated as active materials) for secondary lithium ion systems. In this regard for the negative electrode, in particular materials based on carbon such as graphitic carbon or non-graphitic carbon materials rendered suitable for the intercalation of lithium are known. In addition, metallic and semi-metallic materials that can be alloyed with lithium can also be used, or composites made of such materials with carbon-based materials. For the positive electrode, in particular lithium-metal oxide compounds and lithium-metal phosphate compounds such as $LiCoO_2$ and $LiFePO_4$ are suitable.

To be named as electrochemically inactive components are, in the first place, electrode binders and current collectors. The latter are used to make electrical contact over the largest possible area with the electrochemically active components. They normally consist of flat metal substrates, for example, of metal foils or a metal foam or a metalized nonwoven fabric present in the form of a strip. The electrode binders ensure the mechanical stability of the electrodes and ensure the mutual contact of the particles of electrochemically active material and with the current collector. In addition, the term also includes in particular conductive agents, for example, carbon black.

Suitable as separators for the aforementioned composite bodies are in particular porous plastic films, for example, a polyolefin or a polyether ketone.

To produce electrodes for wound composite bodies, it is usual for pastes comprising the aforementioned electrochemically active components and the electrode binders (and, if appropriate, the conductive agents) to be applied to the aforementioned current collectors in the form of thin layers, dried and brought to the desired shape. Usually, the layers are rolled and pressed following drying. Strip-like positive and negative electrodes formed in this way are combined with each other and with one or more strip-like separators to form a strip-like individual cell. To this end, the electrodes can, for example, be laminated on opposite sides of a separator.

The strip-like individual cell is then supplied to a winding device and, in the latter, is processed to form the wound composite bodies mentioned above. To this end, the individual cell is usually wound onto a coil former or a winding core. After a normally predefined number of windings (here, a winding is understood to mean each complete circulation of the composite around the coil former or winding core), the winding operation is terminated. The wound composite body formed is, for example, separated by a cutting or stamping tool from the immediately following, not yet wound section of the individual cell. Within the coil there is a normally an axially aligned hollow space. The hollow space is then formed, for example, when the coil is removed from the coil former, or else it is filled with a winding core.

The feed and discharge of electrons to and from the electrodes of the composite body is normally carried out via discharge tabs that can project out of the wound composite body formed, for example, at the end. The discharge tabs are attached electrically to the current collectors or are a part of the same.

A very important property of electrochemical cells is their capacity. To achieve a high capacity, as much space as possible must be provided for the electrochemically active materials. If the wound composite bodies described are used, attempts are made to keep the aforementioned axial hollow space within the composite body as small as possible. With regard to the capacity of a cell, the axial hollow space represents a dead volume. However, the smaller the diameter of the hollow space chosen, the more rapidly the winding radius also decreases toward the center of the coil. This leads to high mechanical loading during the winding of the strip-like individual cells described. In extreme cases, electrodes are detached from current collectors and/or separators. This can be counteracted in that the electrodes are imparted a higher mechanical elasticity by the addition of suitable additives. However, since these additives are themselves electrochemically inactive, the capacity of the cell also decreases as a result.

It could therefore be helpful to provide electrochemical cells with a high capacity, wherein the problems are avoided or at least reduced.

SUMMARY

We provide an electrochemical cell including an annular electrode composite body; and an annular liquid-tight housing formed as a hollow cylinder and includes an annular interior space, wherein the housing is arranged around a central aperture or recess, the housing has a height of 5 mm to 40 mm and an external diameter of 6 mm to 20 mm, and the annular electrode composite body is arranged in the annular interior space.

We also provide an apparatus including the cell and at least one electronic component arranged in the central aperture or the recess, wherein the electronic component is supplied with electrical energy by the cell.

DETAILED DESCRIPTION

Figure 1A:
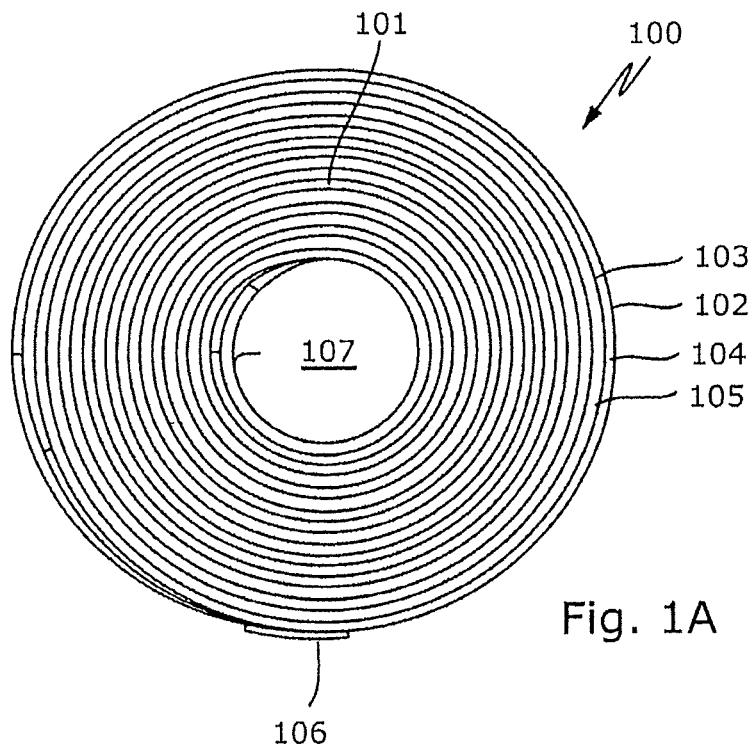
FIG. 1A is a schematic top view of an electrode-separator composite.

We provide electrochemical cells distinguished by the following features:

They comprise an annular electrode composite body. This is, for example, a wound composite body made by spiral winding of strip-like electrodes and at least one strip-like separator as previously described. Reference is hereby made to the explanations relating to wound composite bodies. Particularly preferably, the annular electrode composite body is an electrode coil as described, for example, in FIGS. 3a and 3b of WO 2010/089152 A1.

The composite body must in no way necessarily comprise electrodes with active materials that can absorb lithium ions and discharge them again. In the composite body, it is entirely possible for electrodes of other electrochemical systems to be combined, for example, nickel/metal hydride.

They comprise an annular liquid-tight housing having an annular interior space arranged around a central aperture or recess. Housings of classic round and button cells are formed cylindrically. They do not have a central aperture or recess.

The housing has either the aperture or the recess. The central aperture is always formed continuously. It thus penetrates the housing from one side to another side and is accordingly accessible from two sides of the housing. The recess, on the other hand, is not formed continuously. It is accessible only from one side of the housing.

The annular electrode composite body is arranged in the annular interior space. Most electrical systems require a liquid electrolyte. Thus, for example, nickel/metal hydride cells require an aqueous lye as electrolyte. As a rule, the ion systems require an organic electrolyte with a conductive lithium salt dissolved therein. An electrode composite body impregnated with electrolyte in the interior space is protected against the penetration of moisture. At the same time, the liquid-tight housing also prevents the electrolyte from leaking.

As a rule, our electrochemical cells are further distinguished by at least one of the two following additional features:

The housing has at least two sealing regions separated physically from each other.

The sealing regions are each formed annularly.

The cylindrical housing of round and button cells generally classically comprises two solid, normally metallic housing parts, between which an electrically insulating seal is arranged. These cells always have exactly one sealing region. This is different in our cells. The presence of the central aperture or the recess necessitates these generally having two or more sealing regions. If appropriate, more than one seal is thus also needed to seal off our cells.

Particularly preferably, our cells have at least one of the following additional features:

The housing is formed as a hollow cylinder.

The central aperture or the recess has a cylindrical geometry.

The electrode composite body can be present as a hollow cylindrical coil made of electrode strips and at least one separator, the end faces of which are formed by the longitudinal edges of the electrode strips and in the center of which there is an axially aligned hollow space with openings in the center of the end faces.

The housing can have two circularly annular housing bases spaced apart from each other and parallel to each other and an annual inner housing shell connecting the housing bases and an annular outer housing shell connecting the housing bases, wherein each of the housing shells and each of the housing bases has an inner side pointing into the interior space and an outer side pointing in an opposite direction.

To achieve optimal capacity utilization, it is expedient to coordinate the geometric features of the annular electrode composite body and the annular liquid-tight housing as well as possible with one another. The electrode composite bodies such as, for example, those described in FIGS. 3a and 3b of WO 2010/089152 A1, are virtually perfect hollow cylinders. These are best able to utilize the volume of the annular interior space if the latter likewise has the shape of a hollow cylinder.

The aperture is preferably formed as a continuous, cylindrical hole. The recess is preferably formed as a cylindrical hole which, on one side, is wholly or at least partly closed.

Additionally or alternatively to one or more of the optional features described above with respect to our electrochemical cells, the cells can have the following features:

Example 1

The housing comprises two hollow cylindrical rings of different diameters in a concentric arrangement of which the smaller forms the inner housing shell and the larger forms the outer housing shell. This is one of the simplest housing variants for a cell. To close the housing, two circularly annular openings between the rings must be closed, for example, by a film. The result is four annular sealing regions separated physically from one another.

Example 2

The housing comprises two annular sleeves each made of an annular disk and a hollow cylindrical ring, wherein one of the hollow cylindrical rings is pushed into the other so that the annular disks form the mutually parallel housing bases and the hollow cylindrical rings pushed into each other form the inner housing shell: In this example, the annular sleeves that are pushed together form a disk coil. During production of the annular electrode composite body, the latter can be used as a coil former or winding core. The electrode composite body can therefore be fabricated directly on a housing part.

Example 3

The housing comprises two beaker-like half sections each made of an annular disk, a hollow cylindrical inner ring and outer hollow cylindrical outer ring, wherein one of the half sections is pushed into the other so that the annular disks form the mutually parallel housing bases, and the inner rings form the inner housing shell and the outer rings form the outer housing shell. This example ensures that, after the beaker-like half sections have been combined, no more openings have to be closed.

There is no limitation in the selection of the housing materials. Thus, for example, in Example 3, both half sections can consist of a metal, for example, nickel-plated steel, and thus serve as poles of the cell. In this example, sealing elements with electrically insulating properties are needed, which have to be arranged between the two half sections. In addition, in this example the electrodes of the electrode composite body must be connected electrically to the half sections. This can be done, for example, as known in the art, by discharge tabs being led out of the wound composite body formed at the end side and connected to the housing by welding.

Alternatively, in Example 3, both half sections can also consist of plastic. In this example, however, the housing must provide pole feed-throughs for the purpose of making electrical contact with the electrodes of the electrode composite body.

Our cells are subject to no restriction with regard to size, including the ratios of the diameter (external diameter/internal diameter) or height. In some examples in which the housing is formed as a hollow cylinder, however, it is preferred for its height to exceed its external diameter by a maximum of a factor 2. The height/external diameter ratio may be ≤1.

Particularly preferably, the cells are adapted for miniaturized applications, of which some preferred ones will be described below. Cells for such apparatuses preferably have a hollow cylindrically formed housing with a height in the range of 5 mm to 40 mm and an external diameter of 6 mm to 20 mm. The recess or aperture is preferably formed cylindrically in this example and preferably has a diameter of 3 mm to 10 mm.

Our cells offer advantages not possessed by comparable classic cells. Electrode composite bodies certainly likewise have an axial hollow space within the composite body. However, as a result of our configuration of the housing, this does not lead to a dead volume within the housing. Instead, electronic components supplied with power by our cells can be arranged in the aperture or recess.

Accordingly, we also provide an apparatus comprising our electrochemical cell and at least one electronic component arranged in the central aperture of the annular housing of our electrochemical cell. The electronic component is supplied with electrical energy by the cell.

The electrochemical cell is preferably one of the examples adapted for miniaturized applications, that is to say a cell with a hollow cylindrically formed housing with a height of 5 mm to 30 mm and an external diameter of 8 mm to 20 mm.

The apparatus can be, for example, wireless headphones, in particular in the form of "in-ear headphones", that is to say headphones plugged into the ear and therefore must be very small. The electronic component can accordingly be in particular a loudspeaker or a loudspeaker component or an electronic transmitting and receiving unit, for example, a Wi-Fi or Bluetooth chipset.

In a further example, the apparatus can be a wireless hearing aid, in particular in the form of an "in-ear hearing aid", that is to say a hearing aid plugged into the ear and must therefore be very small. The electronic component can accordingly be in particular a loudspeaker or a loudspeaker component or a microphone or microphone component or an electronic transmitting and receiving unit, for example, a Wi-Fi or Bluetooth chipset, or an electronic amplifier module or a speech processor.

Further features and advantages can be gathered from the drawings and the following description of the drawings. The examples described below serve merely for explanation and better understanding and are in no way to be understood as restrictive.

Figure 1B:
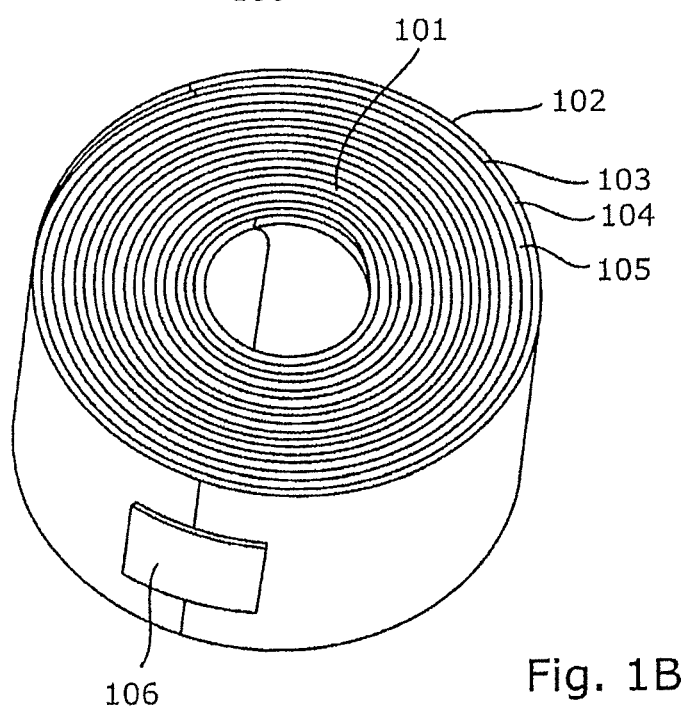
FIG. 1B is a schematic perspective of an electrode-separator composite.

FIGS. 1A and 1B show an electrode-separator composite 100 in the form of a coil that can be used in our electrochemical cell as an electrode composite body (schematic illustration). FIG. 1A is a plan view vertically from above on the end side 101 of the coil. FIG. 1B is a view obliquely from above. The coil 100 is fabricated from a strip-like individual cell comprising two layers of separator strips 102 and 103 and two electrode layers 104 and 105 (a positive and a negative electrode). The strip-like individual cell is wound spirally and held together by an adhesive strip 106. The axial hollow space 107 is located in the center of the coil 100.

Figure 2A:
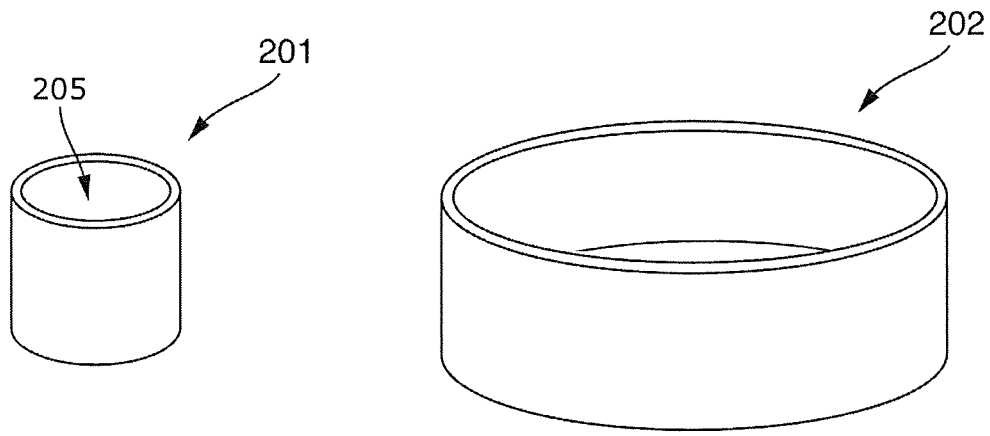
FIG. 2A is a schematic perspective view of two hollow rings that form a housing.
Figure 2A:
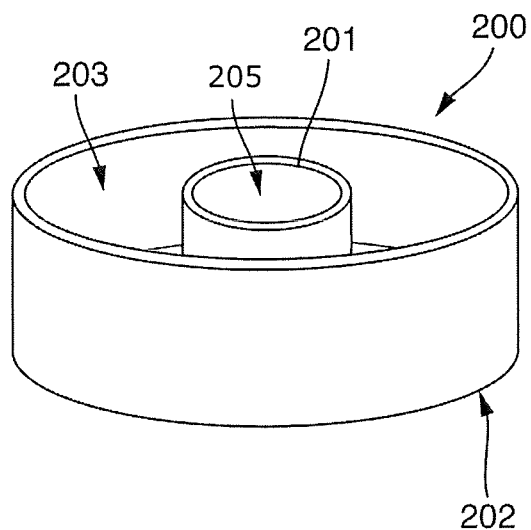

In FIG. 2A, a part 200 of a housing comprising two hollow cylindrical rings 201 and 202 is shown. The ring 201 is arranged within the ring 202 so that the result is a concentric arrangement. An annular electrode composite body, as illustrated in FIG. 1, can be inserted into the interspace 203 between the two rings.

Figure 2B:
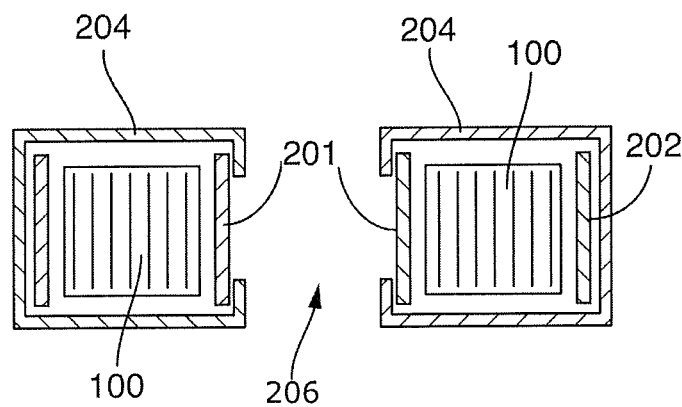
FIG. 2B is a schematic cross-sectional view of an electrochemical cell.

To complete the housing, the circularly annular openings between the regions must be closed, for example, by a film 204. FIG. 2B is a schematic cross-sectional illustration of the electrochemical cell resulting herefrom and having the central aperture 206 which, in size and shape, is substantially identical to the hollow space 205 in the interior of the ring 201.

Figure 3A:
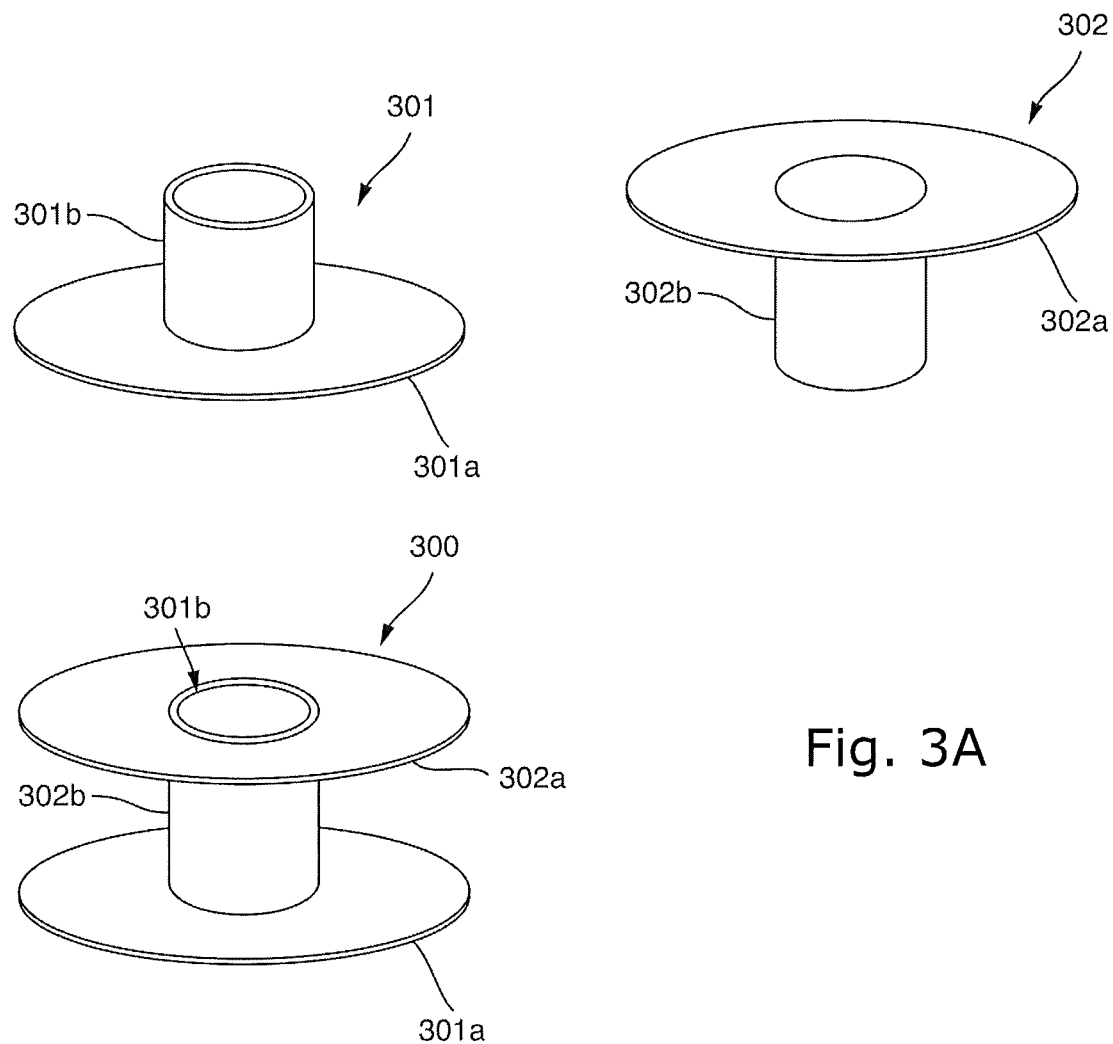
FIG. 3A is a schematic perspective view of disk coils.
Figure 3B:
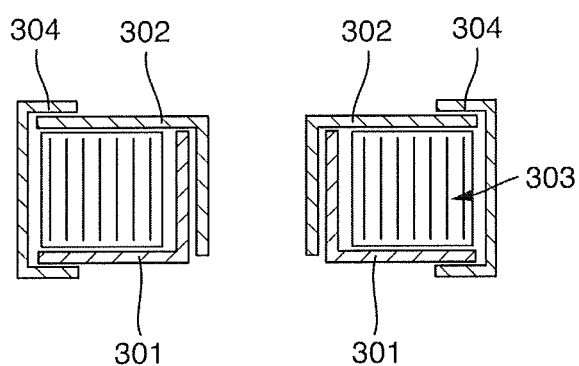
FIG. 3B is a schematic cross-sectional view of another electrochemical cell.

In FIG. 3A, a part 300 of a housing for an electrochemical cell in the form of a disk coil is illustrated. The disk coil has been assembled from the annular sleeves 301 and 302. These each comprise an annular disk 301a and 302a and a hollow cylindrical ring 301b and 302b. The coil can serve as a coil former during the production of an annular electrode composite body. In FIG. 3B, a resultant electrochemical cell is illustrated (schematically, cross-sectional illustration). An annular electrode composite body 303 is wound onto the coil 300 formed from the annular sleeves 301 and 302. The outer shell of the resultant cell is formed by the film 304.

Figure 4A:
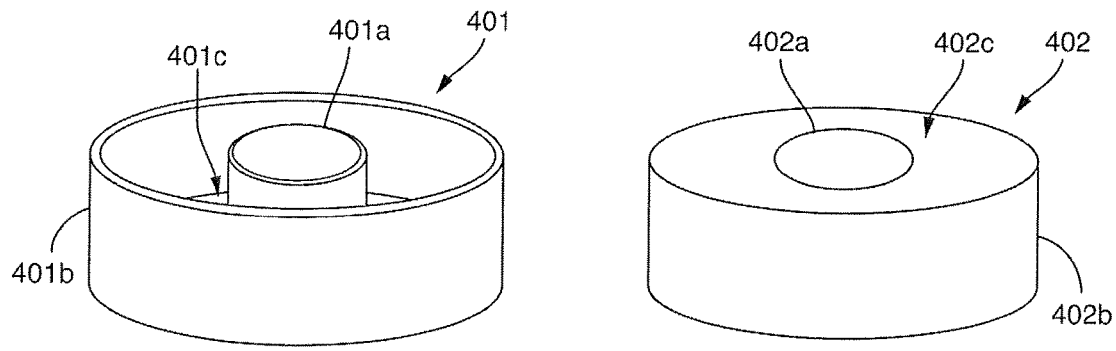
FIG. 4A is a schematic perspective view of another electrochemical cell and the ports forming that cell.
Figure 4A:
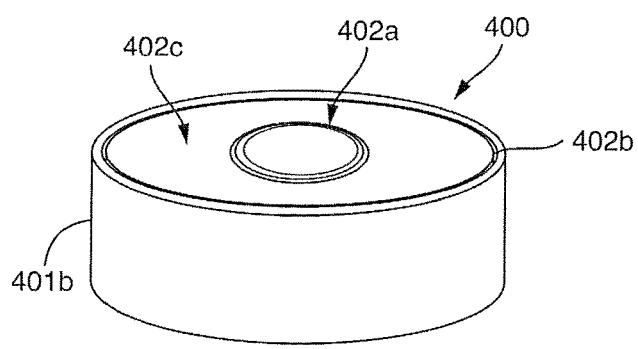
Figure 4B:
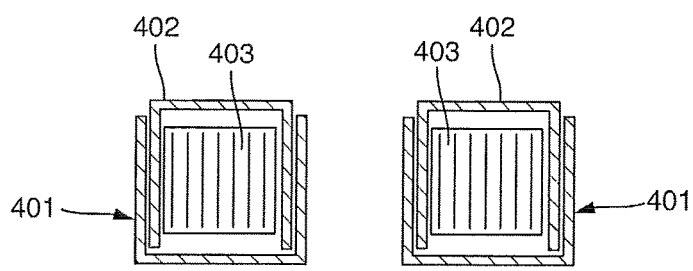
FIG. 4B is a schematic cross-sectional view of the electrochemical cell from FIG. 4A.

In FIG. 4A, a housing 400 for an electrochemical cell is illustrated. This may be formed by pushing the half section 401 into the half section 402. The half sections are each beaker-shaped and comprise a hollow cylindrical inner ring 401a and 402a, a hollow cylindrical outer ring 401b and 402b, and an annular disk 401c and 402c. If the half section 402 is pushed into the half section 401, the annular disks form the bases of the housing 400. In FIG. 4B, the resultant cell including an electrode composite body 403 inserted into the housing is illustrated schematically in cross section. Not illustrated is the contact between the electrodes of the electrode composite body and the half sections 401 and 402. Likewise not illustrated are sealing means which may have to be arranged between the half sections to seal off the housing and to insulate the half sections electrically relative to each other.

Figure 5:
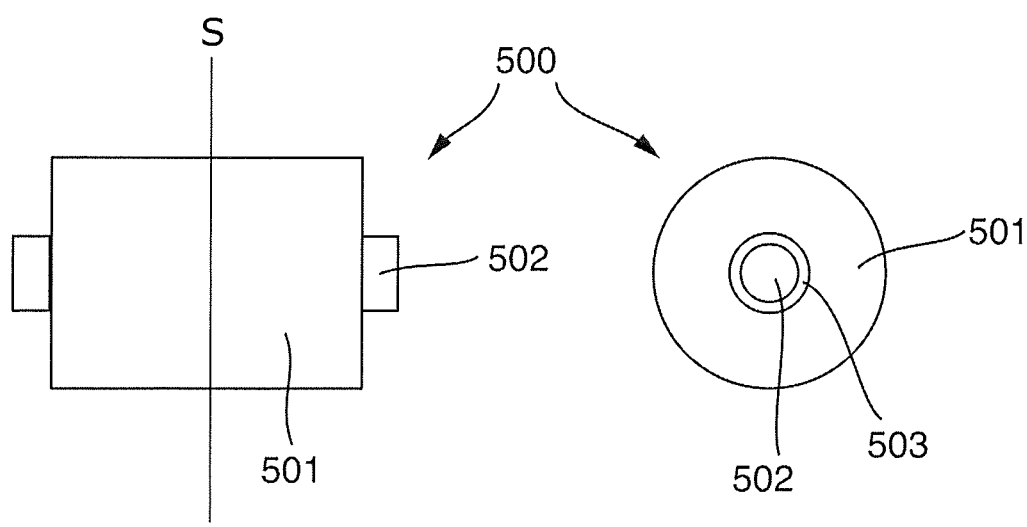
FIG. 5 shows schematic top plan and perspective views of an apparatus comprising an electrochemical cell.

In FIG. 5, an apparatus is illustrated schematically (plan view on the left, cross section along section plane S on the right). 501 designates an electrochemical cell according to the present invention having a central aperture 503. An electronic component 502, for example, a loudspeaker of a hearing aid or of headphones, is arranged in the aperture.

What is claimed is:

1. An electrochemical cell comprising:
   an annular electrode composite body; and
   an annular liquid-tight housing formed as a hollow cylinder and comprising an annular interior space, wherein
   the housing is arranged around a central aperture or recess,
   the housing has a height of 5 mm to 40 mm and an external diameter of 6 mm to 20 mm,
   the annular electrode composite body is arranged in the annular interior space, and
   the housing comprises two circularly annular housing bases spaced apart from each other and parallel to each other and an annular inner housing shell connecting the housing bases and an annular outer housing shell connecting the housing bases, wherein each of the housing shells and each of the housing bases has an inner side pointing into the interior space and an outer side pointing in an opposite direction.

2. The cell as claimed in claim 1, further comprising at least one of:
   the housing has at least two sealing regions separated physically from each other, and
   the at least two sealing regions are each formed annularly.

3. The cell as claimed in claim 1, further comprising at least one of:
   the central aperture or recess has a cylindrical geometry, and
   the electrode composite body is present as a hollow cylindrical coil made of electrode strips and at least one separator strip, end faces of which are formed by longitudinal edges of the electrode strips and in a center of which there is an axially aligned hollow space with openings in the center of the end faces.

4. The cell as claimed in claim 3, further comprising one of:
   the housing comprises two hollow cylindrical rings of different diameters in a concentric arrangement of which the smaller forms the inner housing shell and the larger forms the outer housing shell, and
   the housing comprises two annular sleeves each made of an annular disk and a hollow cylindrical ring, wherein one of the hollow cylindrical rings is pushed into the other so that the annular disks form mutually parallel housing bases and the hollow cylindrical rings pushed into each other form the inner housing shell.

5. An apparatus comprising:
   the cell according to claim 1, and
   at least one electronic component arranged in the central aperture or the recess, wherein
   the electronic component is supplied with electrical energy by the cell.

6. An electrochemical cell comprising:
   an annular electrode composite body; and
   an annular liquid-tight housing formed as a hollow cylinder and comprising an annular interior space, wherein
   the housing is arranged around a central aperture or recess,
   the housing has a height of 5 mm to 40 mm and an external diameter of 6 mm to 20 mm,
   the annular electrode composite body is arranged in the annular interior space, and
   the housing comprises two beaker-like half sections each made of an annular disk, a hollow cylindrical inner ring and a hollow cylindrical outer ring, wherein one of the half sections is pushed into the other so that the annular disks form the mutually parallel housing bases, and the inner rings form the inner housing shell and the outer rings form the outer housing shell.

7. The cell as claimed in claim 6, further comprising at least one of:
   the central aperture or recess has a cylindrical geometry, and
   the electrode composite body is present as a hollow cylindrical coil made of electrode strips and at least one separator strip, end faces of which are formed by longitudinal edges of the electrode strips and in a center of which there is an axially aligned hollow space with openings in the center of the end faces.

* * * * *